United States Patent
Wang

(10) Patent No.: US 12,066,720 B2
(45) Date of Patent: Aug. 20, 2024

(54) ARRAY SUBSTRATE AND LIQUID CRYSTAL DISPLAY PANEL

(71) Applicant: TCL CHINA STAR OPTOELECTRONICS TECHNOLOGY CO., LTD., Shenzhen (CN)

(72) Inventor: Yanan Wang, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/600,082

(22) PCT Filed: Sep. 7, 2021

(86) PCT No.: PCT/CN2021/116830
§ 371 (c)(1),
(2) Date: Sep. 29, 2021

(87) PCT Pub. No.: WO2023/029060
PCT Pub. Date: Mar. 9, 2023

(65) Prior Publication Data
US 2024/0045278 A1    Feb. 8, 2024

(30) Foreign Application Priority Data
Aug. 30, 2021   (CN) .......................... 202111004518.9

(51) Int. Cl.
*G02F 1/1343*    (2006.01)

(52) U.S. Cl.
CPC .............................. *G02F 1/134309* (2013.01)

(58) Field of Classification Search
None
See application file for complete search history.

(56) References Cited

U.S. PATENT DOCUMENTS 9,678,395 B1 *   6/2017   Lin ................... G02F 1/133711
2004/0233360 A1 *  11/2004   Yoshida ............ G02F 1/133555
349/114

(Continued)

FOREIGN PATENT DOCUMENTS

CN        1755464 A      4/2006
CN      103261959 A      8/2013

(Continued)

OTHER PUBLICATIONS

International Search Report in International application No. PCT/CN2021/116830, mailed on May 31, 2022.

(Continued)

*Primary Examiner* — Ryan Crockett
(74) *Attorney, Agent, or Firm* — PV IP PC Chung; Wei Te Chung; Zhigang Ma

(57) ABSTRACT

Disclosed are an array substrate and a liquid crystal display panel. The liquid crystal display panel provided by the embodiment of the present application comprises an array substrate. The array substrate eliminates the main electrode of the buffer area, or eliminates the main electrode of the buffer area and then sets a protruding part and adds DBS electrodes on the array substrate. The pretilt angle conflict between two adjacent areas is reduced, thereby preventing (Continued)

the problem of mutual obstruction when the liquid crystal molecules twist, thereby improving dark clusters and solving the problem of uneven display.

18 Claims, 6 Drawing Sheets

(56) References Cited

U.S. PATENT DOCUMENTS

| | | | |
|---|---|---|---|
| 2006/0066799 A1* | 3/2006 | Mizusako | G02F 1/133707 |
| | | | 349/142 |
| 2006/0215085 A1* | 9/2006 | Wang | G02F 1/133555 |
| | | | 349/114 |
| 2012/0154703 A1* | 6/2012 | Yoshida | G02F 1/137 |
| | | | 349/43 |
| 2015/0378221 A1* | 12/2015 | Tae | G02F 1/134309 |
| | | | 349/143 |
| 2016/0299383 A1* | 10/2016 | Lai | G02F 1/13624 |
| 2016/0370616 A1* | 12/2016 | Cheng | G02F 1/133707 |
| 2017/0045781 A1* | 2/2017 | Bai | G02F 1/13439 |
| 2021/0364866 A1* | 11/2021 | Cao | G02F 1/133707 |
| 2023/0104249 A1* | 4/2023 | Zhang | G02F 1/13439 |
| | | | 349/33 |

FOREIGN PATENT DOCUMENTS

| | | |
|---|---|---|
| CN | 204166255 U | 2/2015 |
| CN | 104880867 A | 9/2015 |
| CN | 105116657 A | 12/2015 |
| CN | 105842937 A | 8/2016 |
| CN | 111308809 A | 6/2020 |
| CN | 111427199 A | 7/2020 |
| CN | 113064299 A | 7/2021 |
| WO | 2020137495 A1 | 7/2020 |

OTHER PUBLICATIONS

Written Opinion of the International Search Authority in International application No. PCT/CN2021/116830, mailed on May 31, 2022.

Chinese Office Action issued in corresponding Chinese Patent Application No. 202111004518.9 dated Jun. 14, 2022, pp. 1-11.

* cited by examiner

ARRAY SUBSTRATE AND LIQUID CRYSTAL DISPLAY PANEL

RELATED APPLICATIONS

This application is a Notional Phase of PCT Patent Application No. PCT/CN2021/116830 having international filing date of Sep. 7, 2021, which claims the benefit of priority of Chinese Patent Application No. 202111004518.9 filed on Aug. 30, 2021. The contents of the above applications are all incorporated by reference as if fully set forth herein in their entirety.

FIELD OF THE INVENTION

The present application relates to a display technology field, and more particularly to an array substrate and a liquid crystal display panel.

BACKGROUND OF THE INVENTION

Liquid crystal display panels face many challenges when they are applied to curved surface display screens. Because the curved surface display screen is realized by bending a plane display screen, a symmetrical elliptical dark cluster will be formed in the curved surface state. The dark clusters are caused by the offset of the upper substrate and lower substrate. The main method to improve the dark cluster is to make the pretilt angle of the upper substrate small and to extremely simplify the topographic structure of the upper substrate.

In the process of research and practice of the prior art, the inventor of the present application found that in practical applications, it is more difficult to achieve an extremely small pretilt angle of the upper substrate, and the topography of the lower substrate will also be the key for improving the dark cluster. Therefore, a certain design of the lower substrate is required. In a multi-domain display liquid crystal display panel, since the pretilt angle conflicts of the corresponding liquid crystal molecules at the junction of the adjacent alignment areas in the pixels are the most serious, the adjacent alignment areas in the sub-pixels are more likely to produce dark clusters.

SUMMARY OF THE INVENTION

The embodiments of the present application provide an array substrate and a liquid crystal display panel, which can buffer the pretilt angle conflicts of the liquid crystal molecules corresponding to the junctions of adjacent alignment areas in the pixels, thereby improving the dark cluster in the curved display screen.

The embodiment of the present application provides an array substrate, comprising:
  a substrate;
  a pixel electrode, disposed on the substrate, and the pixel electrode comprises a first area, a second area and a buffer area, and the buffer area is arranged between the first area and the second area;
  the pixel electrode comprises a plurality of first branch electrodes and a plurality of second branch electrodes, and the plurality of first branch electrodes is arranged at intervals, the plurality of second branch electrodes is arranged at intervals, and an extension direction of the first branch electrodes intersects an extension direction of the second branch electrodes; the first branch electrodes are arranged in the first area, and the second branch electrodes are arranged in the second area;
  the array substrate comprises a buffer structure arranged in the buffer area.

Optionally, in some embodiments of the present application, the buffer structure comprises an opening, and the opening is disposed on the pixel electrode.

Optionally, in some embodiments of the present application, the array substrate further comprises a protruding part, and the protruding part is disposed on the substrate; the protruding part is correspondingly arranged in the buffer area, and the protruding part protrudes away from a surface of the substrate.

Optionally, in some embodiments of the present application, the protruding part comprises a common electrode and an insulating structure layer that are stacked, and the insulating structure layer is arranged on a side of the common electrode away from the substrate, and the common electrode is employed to make the insulating structure layer protrude on a surface of the array substrate away from the substrate.

Optionally, in some embodiments of the present application, a width of the common electrode is between 3 micrometers and 10 micrometers.

Optionally, in some embodiments of the present application, a protrusion height of the protruding part is between 0.05 micrometers and 1 micrometer.

Optionally, in some embodiments of the present application, the pixel electrode further comprises an axis electrode, and the axis electrode is arranged in the buffer area, and The axis electrode is arranged between the plurality of first branch electrodes and the plurality of second branch electrodes, and connects the plurality of first branch electrodes and the plurality of second branch electrodes;
  the buffer structure comprises a protruding part, the protruding part is disposed on the substrate, and the protruding part protrudes on a surface of the array substrate away from the substrate.

Optionally, in some embodiments of the present application, the protruding part comprises a common electrode and an insulating structure layer that are stacked, and the insulating structure layer is arranged on a side of the common electrode away from the substrate, and the common electrode is employed to make the insulating structure layer protrude on a surface of the array substrate away from the substrate.

Optionally, in some embodiments of the present application, a width of the common electrode is between 3 micrometers and 10 micrometers.

Optionally, in some embodiments of the present application, a protrusion height of the protruding part is between 0.05 micrometers and 1 micrometer.

Optionally, in some embodiments of the present application, the array substrate further comprises an auxiliary electrode, and the auxiliary electrode and the pixel electrode are arranged in a same layer and possess a gap, and the auxiliary electrode includes a first auxiliary electrode and a second auxiliary electrode, and the first auxiliary electrode is arranged between two adjacent pixel electrodes, the second auxiliary electrode is arranged in the buffer area, and the second auxiliary electrode is connected to the first auxiliary electrode.

Optionally, in some embodiments of the present application, a width of the second auxiliary electrode is between 2 micrometers and 10 micrometers.

Optionally, in some embodiments of the present application, a distance between the second auxiliary electrode and the pixel electrode is between 3 micrometers and 15 micrometers.

Optionally, in some embodiments of the present application, a width of the buffer area is between 2 micrometers and 12 micrometers.

Optionally, in some embodiments of the present application, the pixel electrode further comprises a third area and a fourth area, and the pixel electrode further comprises a plurality of third branch electrodes and a plurality of fourth branch electrodes, and the plurality of third branch electrodes are arranged at intervals, and the plurality of fourth branch electrodes are arranged at intervals, and an extension direction of the first branch electrodes intersects an extension direction of the third branch electrodes, and an extension direction of the second branch electrodes intersects an extension direction of the fourth branch electrodes, and the third branch electrodes are arranged in the third area, and the fourth branch electrodes are arranged in the fourth area;
wherein the buffer area is further arranged between the third area and the fourth area, and the buffer structure is further employed to buffer a pretilt angle difference between the liquid crystal corresponding to the third area and the liquid crystal corresponding to the fourth area.

Optionally, in some embodiments of the present application, the first area and the second area are arranged in a first direction, the third area is arranged in a second direction corresponding to the first area, and the fourth area is arranged in the second direction corresponding to the second area, and the pixel electrode further comprises a connecting electrode and a main electrode, and the connecting electrode is arranged around the pixel electrode, and the main electrode is arranged between the first branch electrodes and the third branch electrodes, and is further arranged between the second branch electrodes and the fourth branch electrodes, and the connecting electrode and the main electrode are connected to the plurality of first branch electrodes, the plurality of second branch electrodes, the plurality of third branch electrodes and/or the plurality of fourth branch electrodes.

Correspondingly, the embodiment of the present application further provides a liquid crystal display panel, comprising:
an array substrate, comprising a substrate and a pixel electrode, and the pixel electrode is disposed on the substrate, and the pixel electrode comprises a first area, a second area and a buffer area, and the buffer area is arranged between the first area and the second area; the pixel electrode comprises a plurality of first branch electrodes and a plurality of second branch electrodes, and the plurality of first branch electrodes is arranged at intervals, the plurality of second branch electrodes is arranged at intervals, and an extension direction of the first branch electrodes intersects an extension direction of the second branch electrodes; the first branch electrodes are arranged in the first area, and the second branch electrodes are arranged in the second area; the array substrate comprises a buffer structure arranged in the buffer area;
an opposite substrate, disposed opposite to the array substrate;
a liquid crystal layer, disposed between the array substrate and the opposite substrate.

Optionally, in some embodiments of the present application, the buffer structure comprises an opening, and the opening is disposed on the pixel electrode and separates the plurality of first branch electrodes and the plurality of second branch electrodes.

Optionally, in some embodiments of the present application, the array substrate further comprises a protruding part, and the protruding part is disposed on the substrate; the protruding part is correspondingly arranged in the buffer area, and the protruding part protrudes away from a surface of the substrate.

Optionally, in some embodiments of the present application, the array substrate further comprises an auxiliary electrode, and the auxiliary electrode and the pixel electrode are arranged in a same layer and possess a gap, and the auxiliary electrode includes a first auxiliary electrode and a second auxiliary electrode, and the first auxiliary electrode is arranged between two adjacent pixel electrodes, the second auxiliary electrode is arranged in the buffer area, and the second auxiliary electrode is connected to the first auxiliary electrode.

The embodiment of the present application provides an array substrate and a liquid crystal display panel. The array substrate in the embodiment of the present application is provided with a buffer structure, such as eliminating the main electrode of the buffer area, or eliminating the main electrode of the buffer area and then setting a protruding part and adding DBS electrodes on the array substrate to reduce the pretilt angle conflict between two adjacent areas. The array substrate provided by the embodiment of the present application reduces the pretilt angle conflict between two adjacent areas, thereby preventing the problem of mutual obstruction when the liquid crystal molecules twist, thereby improving dark clusters and solving the problem of uneven display for the liquid crystal display panel.

BRIEF DESCRIPTION OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

DETAILED DESCRIPTION OF PREFERRED EMBODIMENTS

Figure 1:
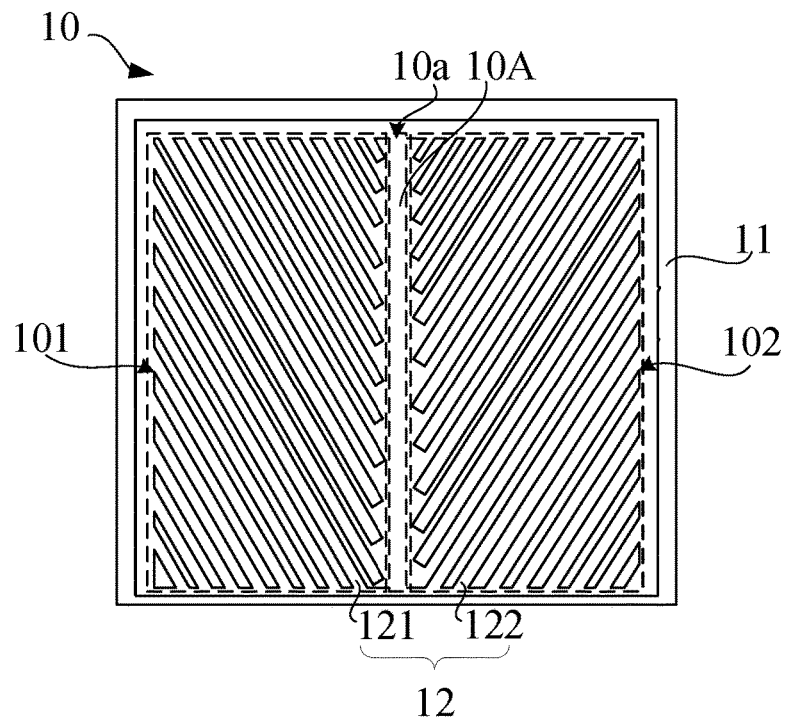
FIG. 1 is a schematic top view diagram of a first structure of an array substrate provided by an embodiment of the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of skilled in the premise of no creative efforts obtained, should be considered within the scope of protection of the present application. Besides, it should be understood that the specific embodiments described herein are merely for illustrating and explaining the present application and are not intended to limit the present application. In this application, if no explanation is made to the contrary, the orientation words used such as "upper" and "lower" usually refer to the upper and lower of the device in actual use or working state, which specifically are the directions of the drawing in the figures; and "inner" and "outer" refer to the outline of the device.

The embodiment of the present application provides an array substrate and a liquid crystal display panel. The detail descriptions are respectively introduced below. It should be noted that the order of description in the following embodiments is not meant to limit the preferred order of the embodiments.

Figure 2:
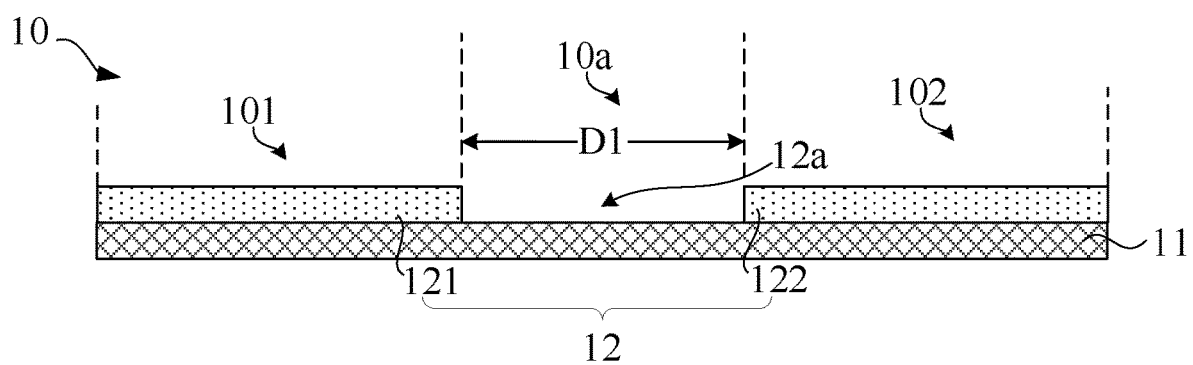
FIG. 2 is a schematic diagram of a first structure of an array substrate provided by an embodiment of the present application.

Please refer to FIG. 1 and FIG. 2. FIG. 1 is a schematic top view diagram of a first structure of an array substrate provided by an embodiment of the present application. FIG. 2 is a schematic diagram of a first structure of an array substrate provided by an embodiment of the present application. The array substrate 10 comprises a substrate 11 and a pixel electrode 12. The pixel electrode 12 is disposed on the substrate 11. The pixel electrode 12 comprises a first area 101, a second area 102 and a buffer area 10a. The buffer area 10a is arranged between the first area 101 and the second area 102. The pixel electrode 12 comprises a plurality of first branch electrodes 121 and a plurality of second branch electrodes 122. The plurality of first branch electrodes 121 is arranged at intervals. The plurality of second branch electrodes 122 is arranged at intervals. An extension direction of the first branch electrodes 121 intersects an extension direction of the second branch electrodes 122. The first branch electrodes 121 are arranged in the first area 101. The second branch electrodes 122 are arranged in the second area 102.

A buffer structure 10A is arranged on the array substrate 10. The buffer structure 10A is employed to buffer difference between a pretilt angle of the liquid crystal molecules in the first area 101 adjacent to the buffer area 10a and a pretilt angle of the liquid crystal molecules in the second area 102 adjacent to the buffer area 10a.

The buffer structure 10A comprises an opening 12a. The opening 12a is disposed on the pixel electrode 12 and separates the plurality of first branch electrodes 121 and the plurality of second branch electrodes 122.

When the array substrate 10 is applied to a curved display screen, since the array substrate 10 and the opposite substrate are offset, the liquid crystal molecules sandwiched between the upper and lower substrates are also offset. According to the distribution of the electric field driving force generated by the pixel electrode 12, in each sub-pixel, usually the area close to the main bone of the pixel electrode 12 is first lighted at low gray levels, and the middle area is gradually lighted to high gray levels. Namely, the liquid crystal molecules arranged corresponding to the pixel electrode 12 are twisted from the periphery of each area to the center, and the pretilt angle conflict between the two areas adjacent to each other will be more serious than other positions. The pretilt angle conflict will hinder the twists of liquid crystal molecules, causing the liquid crystal display panel to form symmetrical elliptical dark clusters between the two areas adjacent to each other, resulting in uneven display.

The pretilt angle refers to a tilt angle of a long axis of the liquid crystal molecule with respect to the array substrate 10 or the opposite substrate.

In the array substrate 10 provided by the embodiment of the present application, the buffer area 10a is disposed between the first area 101 and the second area 102, and the buffer structure 10A is disposed between the first branch electrodes 121 and the second branch electrodes 122. For instance, the buffer structure 10A is an opening 12a, and the main electrode design between the first area 101 and the second area 102 is eliminated. From the perspective of the electric field driving force, the liquid crystal molecules will not start twisting between the first area 101 and the second area 102, which reduces the pretilt angle conflict of the liquid crystal molecules in the buffer area 10a, thereby preventing the problem of mutual obstruction when the liquid crystal molecules twist, thereby improving dark clusters and solving the problem of uneven display.

Figure 3:
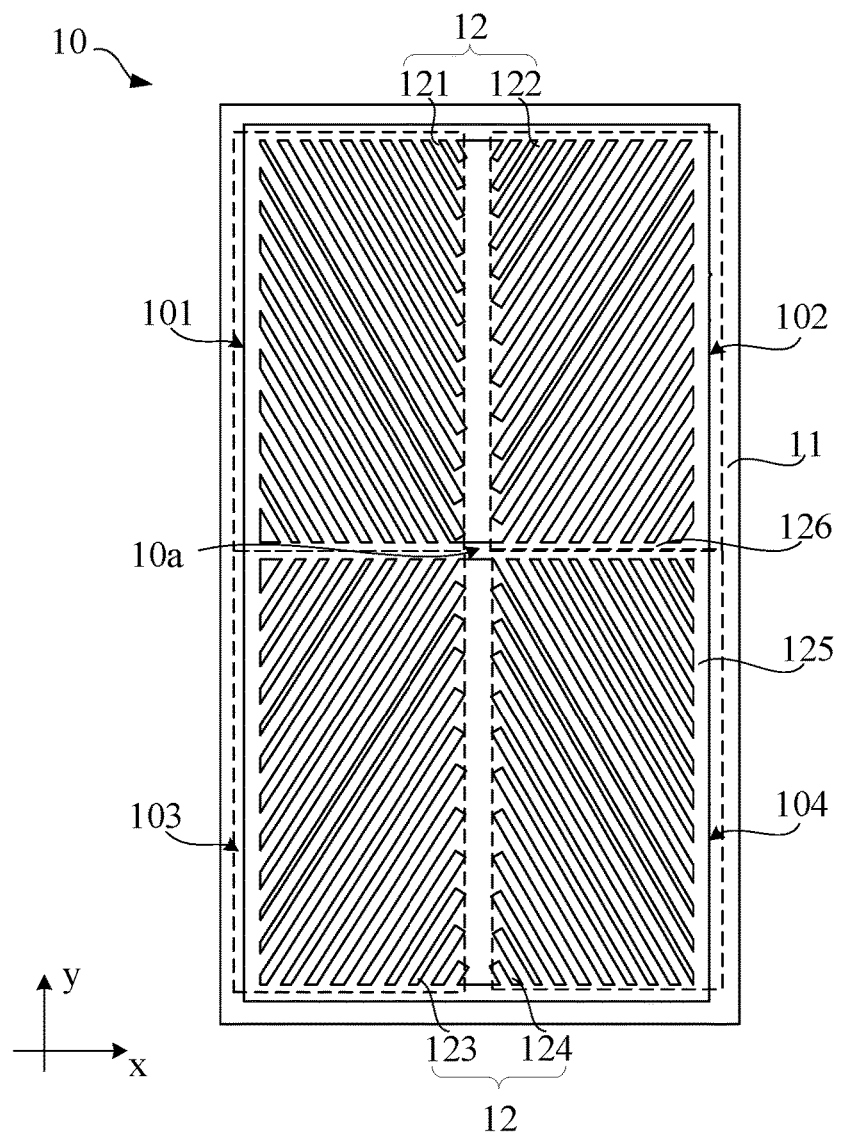
FIG. 3 is a schematic top view diagram of a second structure of an array substrate provided by an embodiment of the present application.

FIG. 1 and FIG. 2 take a pixel design in which the pixel electrode 12 is aligned with two domains for illustration. The array substrate 10 of the present application may further comprise pixel electrodes 12 aligned with four-domains and pixel electrodes 12 aligned with eight-domains. Specifically, the pixel electrodes 12 aligned with four-domains is shown in FIG. 2 and FIG. 3. FIG. 3 is a schematic top view diagram of a second structure of an array substrate provided by an embodiment of the present application. The pixel electrode 12 further comprises a third area 103 and a fourth area 104. The pixel electrode 12 further comprises a plurality of third branch electrodes 123 and a plurality of fourth branch electrodes 124. The plurality of third branch electrodes 123 are arranged at intervals. The plurality of fourth branch electrodes 124 are arranged at intervals. An extension direction of the first branch electrode 121 intersects an extension direction of the third branch electrode 123. An extension direction of the second branch electrodes 122 intersects an extension direction of the fourth branch electrodes 124. The third branch electrodes 123 are arranged in the third area 103. The fourth branch electrodes 124 are arranged in the fourth area 104. The first branch electrodes 121, the second branch electrodes 122, the third branch electrodes 123 and the fourth branch electrodes 124 are employed to direct liquid crystal molecules in four different directions. Specifically, the extension direction of the first branch electrodes 121 and the extension direction of the fourth branch electrodes 124 may be parallel or intersecting. The extension direction of the second branch electrodes 122 and the extension direction of the third branch electrodes 123 may be parallel or intersecting. The branch electrodes in the embodiments of the present application are employed to direct the liquid crystal molecules in four different directions, and the specific extension angle is not limited.

The buffer area 10a is further arranged between the third area 103 and the fourth area 104. The buffer structure 10A is further employed to buffer the pretilt angle different between the liquid crystal molecules of the third area 103 and the liquid crystal molecules of the fourth area 104.

The buffer structure 10A comprises an opening 12a. The opening 12a further separates the plurality of third branch electrodes 123 and the plurality of fourth branch electrodes 124.

The first area 101 and the second area 102 are arranged in a first direction x. The third area 103 is arranged in a second direction y corresponding to the first area 101. The fourth area 104 is arranged in the second direction y corresponding to the second area 102. The pixel electrode 12 further comprises a connecting electrode 125 and a main electrode 126. The connecting electrode 125 is arranged around the pixel electrode 12. The main electrode 126 is arranged between the first branch electrodes 121 and the third branch electrodes 123, and is further arranged between the second branch electrodes 122 and the fourth branch electrodes 124. The connecting electrode 125 and the main electrode 126 are connected to the plurality of first branch electrodes 121, the plurality of second branch electrodes 122, the plurality of third branch electrodes 123 and/or the plurality of fourth branch electrodes 124. The first direction x is the direction extending along the x-axis in the figure, and the second direction y is the direction extending along the y-axis in the figure. In the present application, the first direction x and the second direction y are used for illustration.

The array substrate 10 provided in FIG. 3 eliminates the vertical part of the cross main electrode in the pixel electrodes 12 aligned with four-domains, that is, the position where the dark clusters occur. Then, the twists of the liquid crystal molecules corresponding to respective areas will not be directed by the electrodes between two adjacent areas arranged along the first direction, and the periphery of each area will not be first lighted when the gray scale is low. The array substrate 10 provided by the embodiment of the present application can reduce the pretilt angle conflict between two adjacent areas, thereby preventing the problem of mutual obstruction when the liquid crystal molecules twist, thereby improving dark clusters and solving the problem of uneven display.

Specifically, in the present application, the main electrode 126 is reserved to ensure the four-domain alignment of the liquid crystal molecules. If the cross part is entirely cancelled, the direction of the electric field may change, which will cause the alignment direction of the liquid crystal to change and affect the display.

In respective areas, a plurality of pixel electrodes 12 is parallel to one another and arranged at intervals. The pixel electrode 12 in such arrangement can cause the liquid crystal molecules to be arranged in multiple directions on the horizontal plane, and several different alignment areas can be obtained. In respective areas, an angle between the plurality of pixel electrodes 12 and the main electrode 126 is greater than 0 degrees and less than 90 degrees. Optionally, the pixel electrodes 12 in the first area 101, the pixel electrodes 12 in the second area 102, the pixel electrodes 12 in the third area 103 and the pixel electrodes 12 in the fourth area 104 are arranged in a center-symmetrical manner. This arrangement is more conducive to the alignment performance of the liquid crystal.

A width of the buffer area 10a is between 2 micrometers and 12 micrometers. Specifically, the width of the buffer area 10a may be 2 micrometers, 3 micrometers, 4 micrometers, 5 micrometers, 6 micrometers, 7 micrometers, 8 micrometers, 9 micrometers, 10 micrometers, 11 micrometers or 12 microns. Specifically, the foregoing values are only examples. In fact, the width of the buffer area 10a can be any value between 2 micrometers and 12 micrometers. Since the angles of the branch electrodes will affect the tilting direction of the liquid crystal molecules, the width of the buffer area 10a can be adaptively designed according to the angles of the branch electrodes in the respective areas. For instance, when the angles formed by the first branch electrodes 121 and the second branch electrodes 122 with the first direction are small, the liquid crystal molecules are more likely to hinder each other from tilting. Then, the width of the buffer area 10a can be set to a value close to 12 micrometers. Similarly, when the angles formed by the first branch electrodes 121 and the second branch electrodes 122 with the first direction are larger, the liquid crystal molecules in two adjacent areas are tilted at a larger angle but not easy to collide with each other. The width of the buffer area 10a can be set to a value close to 2 micrometers to increase the aperture ratio. However, the width of the buffer area 10a should not be set to a value smaller than 2 micrometers. Due to the limitation of process accuracy, the first branch electrodes 121 and the second branch electrodes 122 are likely to be in contact with each other when the width is less than 2 micrometers, which affects the alignment effect of the liquid crystal molecules.

Figure 4:
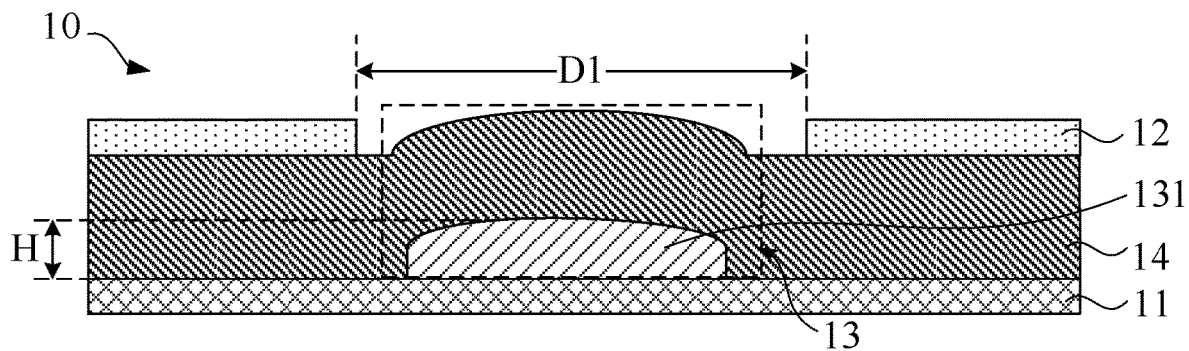
FIG. 4 is a schematic diagram of a second structure of an array substrate provided by an embodiment of the present application.

Please refer to FIG. 4. FIG. 4 is a schematic diagram of a second structure of an array substrate provided by an embodiment of the present application. The array substrate 10 further comprises a protruding part 13. The protruding part 13 is disposed on the substrate 11. The protruding part 13 is correspondingly arranged in the buffer area 10a. The protruding part 13 protrudes away from a surface of the substrate 11.

In the embodiment shown in FIG. 4, the protruding part 13 is provided to increase the film height of the buffer area 10a. Since there is a certain anchoring force between the array substrate 10 and the liquid crystal molecules, when the height of the film layer between two adjacent areas is raised, the pretilt angle of the corresponding liquid crystal molecules at this position can be slightly different from the corresponding liquid crystal molecules on both sides. Then, the pretilt angle difference of the liquid crystal molecules corresponding to two adjacent areas is reduced. Thus, providing the protruding part 13 at the junction of the two areas can improve the phenomenon of dark clusters generated during display.

A protrusion height H of the protruding part 13 is between 0.05 micrometers and 1 micrometer. Specifically, the height H of the protruding part 13 may be 0.05 micrometers, 0.1 micrometer, 0.2 micrometers, 0.3 micrometers, 0.4 micrometers, 0.5 micrometers, 0.6 micrometers, 0.7 micrometers, 0.8 micrometers, 0.9 micrometers or 1 micrometer. If the height H of the protruding part 13 is too high, the pretilt angle difference between the liquid crystal molecules corresponding to the protruding part 13 and the liquid crystal molecules at both sides is too large, and dark clusters are likely to be generated at both sides of the protruding part 13. If the height H of the protruding part 13 is too low, it is difficult for the protruding part 13 to increase the height of the film layer, and the angle difference between the liquid crystal molecules corresponding to the protruding part 13 and the liquid crystal molecules at both sides cannot improve the dark clusters.

The protruding shape of the protruding part 13 is a symmetrical shape, and the symmetrical protruding part 13 can betterly balance the pretilt angles of two adjacent areas along the first direction.

The protruding part 13 may comprise a metal film layer. When the protruding part 13 comprises a metal film layer, an insulating structure layer 14 must be provided to prevent the metal film layer from contacting the pixel electrode and cause a short circuit. Specifically, a metal layer is provided in the array substrate 10 to form a common electrode or other lines, and the metal film layer in the protruding part 13 can be provided in the same layer as the metal layer of the array substrate to save process cost.

Please continue to refer to FIG. 4. The protruding part 13 comprises a common electrode 131 and an insulating structure layer 14 that are stacked. The insulating structure layer 14 is arranged on a side of the common electrode 131 away from the substrate 11. The common electrode 131 is employed to make the insulating structure layer 14 protrude on a surface of the array substrate 10 away from the substrate 11.

A width of the common electrode 131 is between 3 micrometers and 10 micrometers. Specifically, the width of the common electrode 131 may be 3 micrometers, 4 micrometers, 5 micrometers, 6 micrometers, 7 micrometers, 8 micrometers, 9 micrometers or 10 micrometers. The width of the common electrode 131 can also be other values between 3 micrometers and 10 micrometers. Considering the limitation of process accuracy, the width of the common electrode 131 is set to be 3 micrometers or more. In addition, in order to ensure the display effect of the display panel, the width of the common electrode 131 is set to be 10 micrometers or less. In addition, if the width of the common electrode 131 is too large, on the one hand, the aperture ratio of the display panel will be affected. On the other hand, the common electrode 131 may overlap with the pixel electrode 12 above. The height-increased film layer will affect the arrangement of the pixel electrode 12, thereby affecting the twists of the liquid crystal molecules. If the width of the common electrode 131 is too small, the effect of improving the pretilt angle conflict between two adjacent areas is not obvious, and the effect of improving the dark clusters cannot be achieved.

In the embodiment shown in FIG. 4, the common electrode 131 and the insulating structure layer 14 stacked on the common electrode 131 are employed as the protruding part 13 to increase the height of the film layer. The common electrode 131 in the buffer area 10a is shown in FIG. 4. In actual products, the common electrode 131 may also possess other patterned designs. The common electrode 131 is an original film structure in the array substrate 10. In this embodiment, only the common electrode 131 needs to be patterned to form the protruding part 13, which can simplify the manufacturing process of the protruding part 13. Besides, the common electrode 131 is made of a metal material, which can shield the transmitted light at the corresponding position of the protruding part 13 and reduce the influence of the dislocation of the upper and lower substrates in the curved display screen while displaying.

The common electrode 131 can be directly connected to the common electrode in other position, or connected through a conductive line. After the common electrode 131 is connected to the common electrode at other position, the common electrode 131 can obtain the same potential as the common electrode at other position. Therefore, it can be ensured that the twists of the liquid crystal molecules in two adjacent areas are not affected.

Optionally, the protruding part 13 may also be formed by the insulating structure layer 14. For instance, the insulating structure layer 14 comprises a planarization layer. The planarization layer protrudes on a surface of the array substrate 10 away from the substrate 11. For another instance, the insulating structure layer 14 comprises a color resist layer. The color resist layer protrudes on a surface of the array substrate 10 away from the substrate 11.

Figure 5:
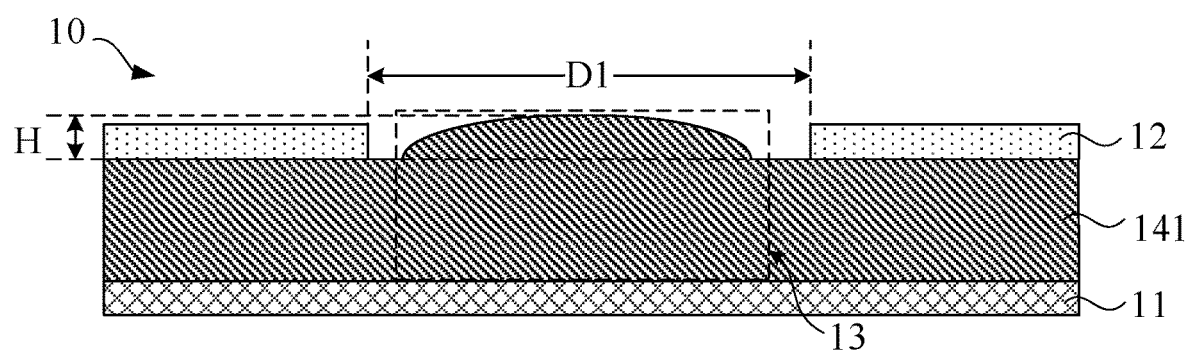
FIG. 5 is a schematic diagram of a third structure of an array substrate provided by an embodiment of the present application.

Optionally, the protruding part 13 may be directly formed by a film layer such as a planarization layer or a color resist layer. Specifically, please refer to FIG. 5. FIG. 5 is a schematic diagram of a third structure of an array substrate provided by an embodiment of the present application. The protruding part 13 comprises a planarization layer 141. The planarization layer 141 protrudes on a surface of the array substrate 10 away from the substrate 11.

In the embodiment shown in FIG. 5, the protruding part 13 comprises the planarization layer 141. The planarization layer 141 can be treated differently by changing the exposure amount to the planarization layer 141 with implementing a halftone mask method. Thus, the planarization layer 141 protrudes on a surface of the array substrate 10 away from the substrate 11.

In this embodiment, the protrusion is directly formed on the planarization layer 141, and the manufacturing process is simpler. Generally, the pixel electrode 12 is disposed on the planarization layer 141. In this embodiment, the protruding part 13 is formed on the planarization layer 141, which can avoid the influence on other film layers. Moreover, it is not necessary to adapt the specific arrangements of other film layers after disposing the protrusions.

Figure 6:
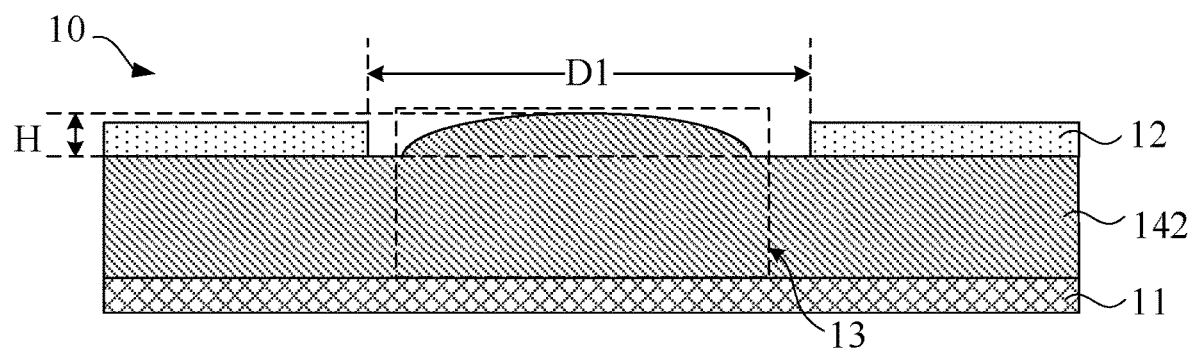
FIG. 6 is a schematic diagram of a fourth structure of an array substrate provided by an embodiment of the present application.

Optionally, please refer to FIG. 6. FIG. 6 is a schematic diagram of a fourth structure of an array substrate provided by an embodiment of the present application. The protruding part 13 comprises a color resist layer 142. The color resist layer 142 protrudes on a surface of the array substrate 10 away from the substrate 11.

For some liquid crystal display panels using COA technology, protrusions may be disposed on the color resist layer 142 to form the protruding part 13. The COA (Color Filter On Array) technology is to prepare the color filter layer on the array substrate. Because no alignment issue of the color filter substrate and the array substrate exists in the liquid crystal display panel with the COA structure. The difficulty of the cell process in the display panel manufacture process can be reduced to prevent the tolerance of the cell process. Accordingly, the black matrix in the COA structure can be designed to be narrow line width for promoting the aperture ratio. In the present application, the color resist layer 142 is employed to form the protruding part 13, so that the array substrate 10 provided in the present application can be applied to a COA type liquid crystal display panel, and the application field is wider.

Specifically, the protruding part 13 in the array substrate 10 provided by the embodiments of the present application may also be formed with protrusions on any film layer disposed in the substrate 11 and the pixel electrode 12, which is not limited in this application.

Figure 7:
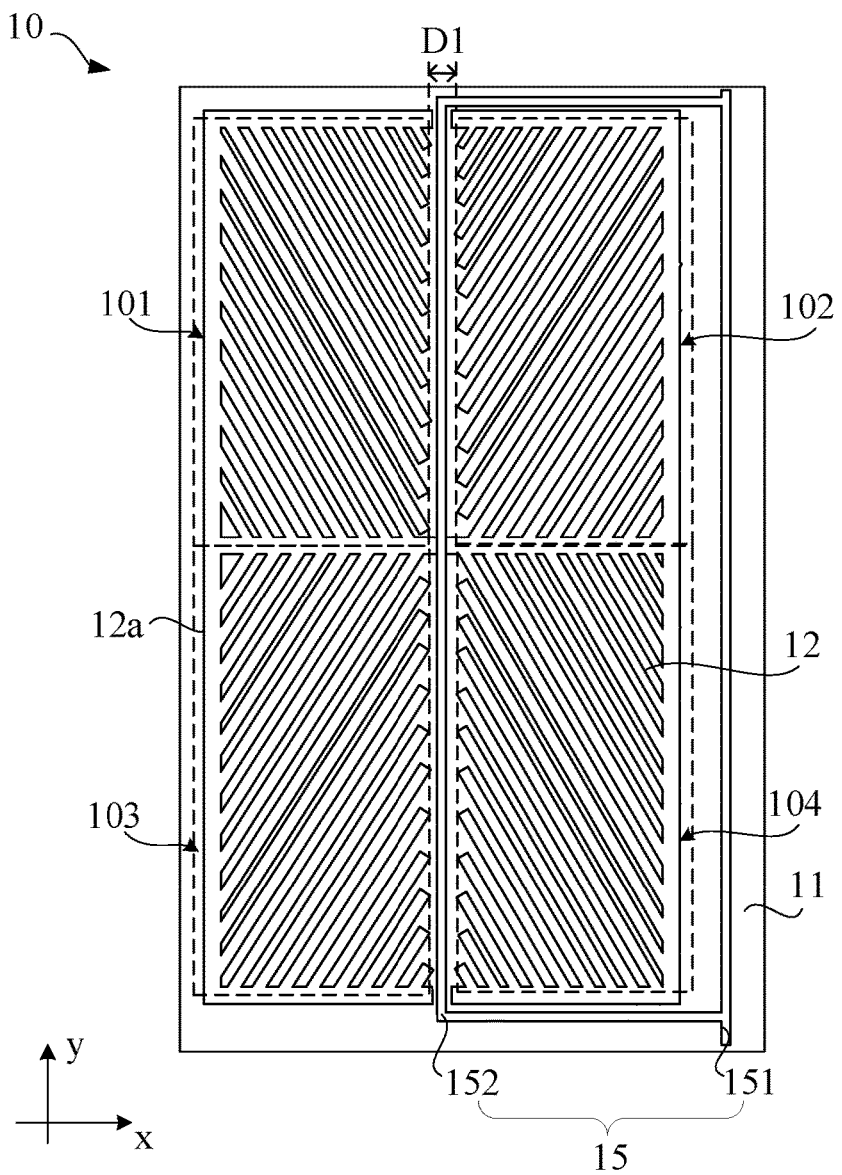
FIG. 7 is a schematic top view diagram of a third structure of an array substrate provided by an embodiment of the present application.

Please refer to FIG. 7. FIG. 7 is a schematic top view diagram of a third structure of an array substrate provided by an embodiment of the present application. The array substrate 10 further comprises an auxiliary electrode 15. The auxiliary electrode 15 and the pixel electrode 12 are arranged in a same layer and possess a gap. The auxiliary electrode 15 comprises a first auxiliary electrode 151 and a second auxiliary electrode 152. The first auxiliary electrode 151 is arranged between two adjacent pixel electrodes 12. The second auxiliary electrode 152 is arranged in the buffer area 10a. The second auxiliary electrode 152 is connected to the first auxiliary electrode 151.

The auxiliary electrode 15 is employed to replace the black matrix for light shielding. The data line BM Less (DBS) design is adopted to reduce the black matrix, and the data line is covered with a conductive line, that is, the auxiliary electrode 15 of the present application. For instance, the auxiliary electrode 15 may be an indium tin oxide (ITO) line. The ITO lines are arranged along the direction of the data lines, and the width of the ITO lines is slightly wider than that of the data lines, and these ITO lines are connected to the common electrode. When the liquid crystal display panel is working normally, the electric field formed by these DBS electrodes and the common electrode of the opposite substrate (not shown in FIG. 6) can keep the liquid crystal molecules in an untwisted state, thereby achieving the purpose of shielding light.

Therefore, in the embodiment shown in FIG. 7, the second auxiliary electrode 152 is disposed in the buffer area 10a. The potential of the second auxiliary electrode 152 is the same as the potential of the common electrode of the opposite substrate, and the liquid crystal molecules corresponding to the second auxiliary electrode 152 will not be twisted. Therefore, the pretilt angle conflict of the liquid crystal molecules in two adjacent areas is avoided, and the phenomenon of displaying dark clusters is improved.

When the second auxiliary electrode 152 is disposed in the buffer area 10a, the second auxiliary electrode 152 possesses the equal distance from the first area 101 and the second area 102. Similarly, the second auxiliary electrode 152 possesses the equal distance from the third area 103 and the fourth area 103. By adopting this method to arrange the second auxiliary electrode 152, the second auxiliary electrode 152 can be positioned at the center of two adjacent areas, and the pretilt angle conflict of the liquid crystal molecules of the two adjacent areas along the first direction can be betterly balanced.

Specifically, in the embodiment shown in FIG. 7, the auxiliary electrode 15 is disposed on the array substrate 10 where no protruding part is provided. In some embodiments, after the protruding part is provided, the auxiliary electrode 15 and the pixel electrode 12 may be arranged in the same layer, and the second auxiliary electrode 152 may be arranged in the buffer area 10a to achieve a better effect of reducing pretilt angle conflict.

Figure 8:
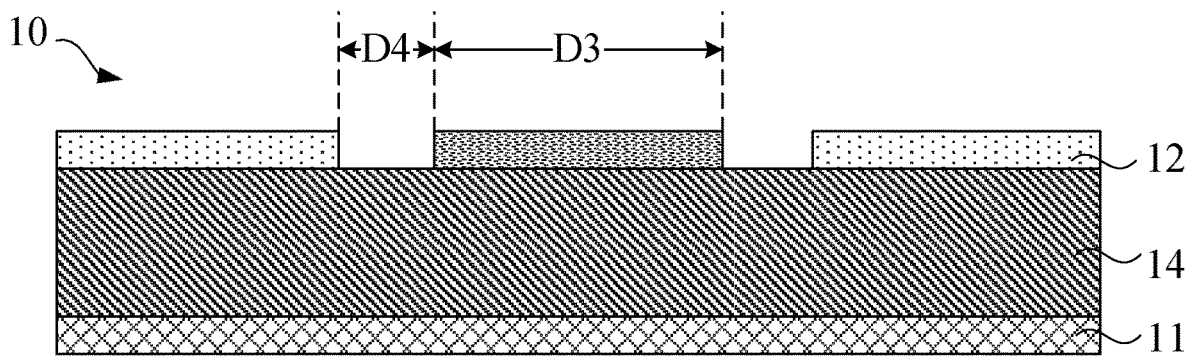
FIG. 8 is a schematic diagram of a fifth structure of an array substrate provided by an embodiment of the present application.

Please refer to FIG. 8. FIG. 8 is a schematic diagram of a fifth structure of an array substrate provided by an embodiment of the present application. A width D3 of the second auxiliary electrode 152 is between 3 micrometers and 10 micrometers. Specifically, the width D3 of the second auxiliary electrode 152 may be 2 micrometers, 3 micrometers, 4 micrometers, 5 micrometers, 6 micrometers, 7 micrometers, 8 micrometers, 9 micrometers or 10 micrometers.

A distance D4 between the second auxiliary electrode 152 and the pixel electrode 12 is between 3 micrometers and 15 micrometers. Specifically, the distance D4 between the second auxiliary electrode 152 and the pixel electrode 12 may be 3 micrometers, 4 micrometers, 5 micrometers, 6 micrometers, 7 micrometers, 8 micrometers, 9 micrometers, 10 micrometers, 11 micrometers, 12 micrometers, 13 micrometers, 14 micrometers or 15 micrometers.

In order to avoid affecting the pixel aperture ratio, it is necessary to ensure that the width of the buffer area 10a cannot be too large. The second auxiliary electrode 152 is arranged in the buffer area 10a, and it is necessary to ensure that the width of the second auxiliary electrode 152 cannot be too small, otherwise a good shielding effect cannot be achieved. However, the width of the second auxiliary electrode 152 should not be too large. If the width of the second auxiliary electrode 152 is too large, the distance from the pixel electrode 12 will be shorter. Parasitic capacitance will be generated between the pixel electrode 12 and the second auxiliary electrode 152, which will affect the twists of the liquid crystal molecules. Considering the requirements of process accuracy and display effect, the width D3 of the second auxiliary electrode 152 is set between 3 micrometers and 10 micrometers. The distance D4 between the second auxiliary electrode 152 and the pixel electrode 12 is set between 3 micrometers and 15 micrometers.

Figure 9:
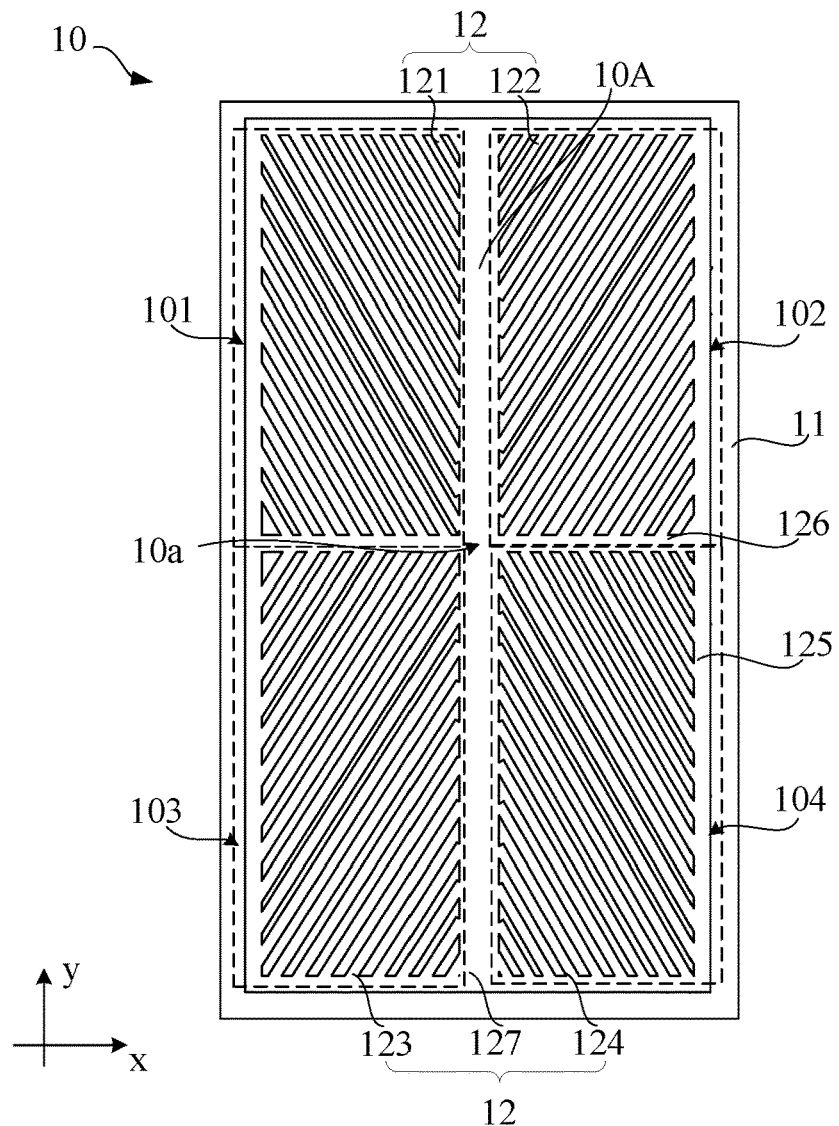
FIG. 9 is a schematic top view diagram of a fourth structure of an array substrate provided by an embodiment of the present application.
Figure 10:
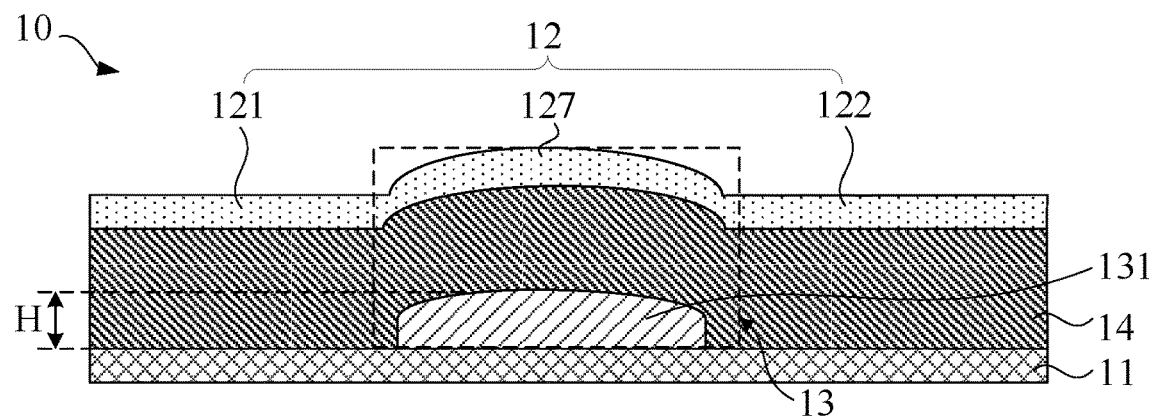
FIG. 10 is a schematic diagram of a sixth structure of an array substrate provided by an embodiment of the present application.

Please refer to FIG. 9 and FIG. 10. FIG. 9 is a schematic top view diagram of a fourth structure of an array substrate provided by an embodiment of the present application. FIG. 10 is a schematic diagram of a sixth structure of an array substrate provided by an embodiment of the present application.

In the array substrate 10, the pixel electrode 12 further comprises an axis electrode 127. The axis electrode 127 is arranged in the buffer area 10a. The axis electrode 127 is disposed between the plurality of first branch electrodes 121 and the plurality of second branch electrodes 122 and connected to the plurality of first branch electrodes 121 and the plurality of second branch electrodes 122.

The pixel electrode 12 further comprises a third area 103 and a fourth area 104. The pixel electrode 12 further comprises a plurality of third branch electrodes 123 and a plurality of fourth branch electrodes 124. The plurality of third branch electrodes 123 are arranged at intervals. The plurality of fourth branch electrodes 124 are arranged at intervals. An extension direction of the first branch electrode 121 intersects an extension direction of the third branch electrode 123. An extension direction of the second branch electrodes 122 intersects an extension direction of the fourth branch electrodes 124. The third branch electrodes 123 are arranged in the third area 103. The fourth branch electrodes 124 are arranged in the fourth area 104. The first branch electrodes 121, the second branch electrodes 122, the third branch electrodes 123 and the fourth branch electrodes 124 are employed to direct liquid crystal molecules in four different directions. Specifically, the extension direction of the first branch electrodes 121 and the extension direction of the fourth branch electrodes 124 may be parallel or intersecting. The extension direction of the second branch electrodes 122 and the extension direction of the third branch electrodes 123 may be parallel or intersecting. The branch electrodes in the embodiments of the present application are employed to direct the liquid crystal molecules in four different directions, and the specific extension angle is not limited.

The buffer area 10a is further arranged between the third area 103 and the fourth area 104. The buffer structure 10A is employed to buffer the pretilt angle different between the liquid crystal molecules of the third area 103 and the liquid crystal molecules of the fourth area 104.

The first area 101 and the second area 102 are arranged in a first direction x. The third area 103 is arranged in a second direction y corresponding to the first area 101. The fourth area 104 is arranged in the second direction y corresponding to the second area 102. The pixel electrode 12 further comprises a connecting electrode 125 and a main electrode 126. The connecting electrode 125 is arranged around the pixel electrode 12. The main electrode 126 is arranged between the first branch electrodes 121 and the third branch electrodes 123, and is further arranged between the second branch electrodes 122 and the fourth branch electrodes 124. The connecting electrode 125 and the main electrode 126 are connected to the plurality of first branch electrodes 121, the plurality of second branch electrodes 122, the plurality of third branch electrodes 123 and/or the plurality of fourth branch electrodes 124. The first direction x is the direction extending along the x-axis in the figure, and the second direction y is the direction extending along the y-axis in the figure. In the present application, the first direction x and the second direction y are used for illustration.

The array substrate 10 comprises a protruding part 13. The protruding part 13 is disposed on the substrate 11. The protruding part 13 protrudes on a surface of the array substrate 10 away from the substrate 11.

The protruding part 13 is provided to increase the film height of the buffer area 10a. Since there is a certain anchoring force between the array substrate 10 and the liquid crystal molecules, when the height of the film layer between two adjacent areas is raised, the pretilt angle of the corresponding liquid crystal molecules at this position can be slightly different from the corresponding liquid crystal molecules on both sides. Then, the pretilt angle difference of the liquid crystal molecules corresponding to two adjacent areas is reduced. Thus, providing the protruding part 13 at the junction of the two areas can improve the phenomenon of dark clusters generated during display.

A protrusion height H of the protruding part 13 is between 0.05 micrometers and 1 micrometer. Specifically, the height H of the protruding part 13 may be 0.05 micrometers, 0.1 micrometer, 0.2 micrometers, 0.3 micrometers, 0.4 micrometers, 0.5 micrometers, 0.6 micrometers, 0.7 micrometers, 0.8 micrometers, 0.9 micrometers or 1 micrometer. If the height H of the protruding part 13 is too high, the pretilt angle difference between the liquid crystal molecules corresponding to the protruding part 13 and the liquid crystal molecules at both sides is too large, and dark clusters are likely to be generated at both sides of the protruding part 13. If the height H of the protruding part 13 is too low, it is difficult for the protruding part 13 to increase the height of the film layer, and the angle difference between the liquid crystal molecules corresponding to the protruding part 13 and the liquid crystal molecules at both sides cannot improve the dark clusters.

The protruding shape of the protruding part 13 is a symmetrical shape, and the symmetrical protruding part 13 can betterly balance the pretilt angles of two adjacent areas along the first direction.

The protruding part 13 may comprise a metal film layer. When the protruding part 13 comprises a metal film layer, an insulating structure layer 14 must be provided to prevent the metal film layer from contacting the pixel electrode and cause a short circuit. Specifically, a metal layer is provided in the array substrate 10 to form a common electrode or other lines, and the metal film layer in the protruding part 13 can be provided in the same layer as the metal layer of the array substrate to save process cost.

Please continue to refer to FIG. 10. The protruding part 13 comprises a common electrode 131, an insulating structure layer 14 and an axis electrode 127 that are stacked. The insulating structure layer 14 is arranged on a side of the common electrode 131 away from the substrate 11. The common electrode 131 is employed to make the insulating structure layer 14 protrude on a surface of the array substrate 10 away from the substrate 11. Since the axis electrode 127 is arranged above the insulating structure layer 14, it is naturally raised and protrudes on a surface of the array substrate 10 away from the substrate 11.

A width of the common electrode 131 is between 3 micrometers and 10 micrometers. Specifically, the width of the common electrode 131 may be 3 micrometers, 4 micrometers, 5 micrometers, 6 micrometers, 7 micrometers, 8 micrometers, 9 micrometers or 10 micrometers. The width of the common electrode 131 can also be other values between 3 micrometers and 10 micrometers. Considering the limitation of process accuracy, the width of the common electrode 131 is set to be 3 micrometers or more. In addition, in order to ensure the display effect of the display panel, the width of the common electrode 131 is set to be 10 micrometers or less. In addition, if the width of the common electrode 131 is too large, on the one hand, the aperture ratio of the display panel will be affected. On the other hand, the common electrode 131 may overlap with the pixel electrode 12 above. The height-increased film layer will affect the arrangement of the pixel electrode 12, thereby affecting the twists of the liquid crystal molecules. If the width of the common electrode 131 is too small, the effect of improving the pretilt angle conflict between two adjacent areas is not obvious, and the effect of improving the dark clusters cannot be achieved.

The common electrode 131 and the insulating structure layer 14 stacked on the common electrode 131 are employed as the protruding part 13 to increase the height of the film layer. In actual products, the common electrode 131 may also possess other patterned designs. The common electrode 131 is an original film structure in the array substrate 10. In this embodiment, only the common electrode 131 needs to be patterned to form the protruding part 13, which can simplify the manufacturing process of the protruding part 13. Besides, the common electrode 131 is made of a metal material, which can shield the transmitted light at the corresponding position of the protruding part 13 and reduce the influence of the dislocation of the upper and lower substrates in the curved display screen while displaying.

The common electrode 131 can be directly connected to the common electrode in other position, or connected through a conductive line. After the common electrode 131 is connected to the common electrode at other position, the common electrode 131 can obtain the same potential as the common electrode at other position. Therefore, it can be ensured that the twists of the liquid crystal molecules in two adjacent areas are not affected.

Optionally, the protruding part 13 may also be formed by the insulating structure layer 14. For instance, the insulating structure layer 14 comprises a planarization layer. The planarization layer protrudes on a surface of the array substrate 10 away from the substrate 11. For another instance, the insulating structure layer 14 comprises a color resist layer. The color resist layer protrudes on a surface of the array substrate 10 away from the substrate 11. Similarly, since the axis electrode 127 is arranged above the planarization layer and the color resist layer, it is naturally raised and protrudes on a surface of the array substrate 10 away from the substrate 11.

Figure 11:
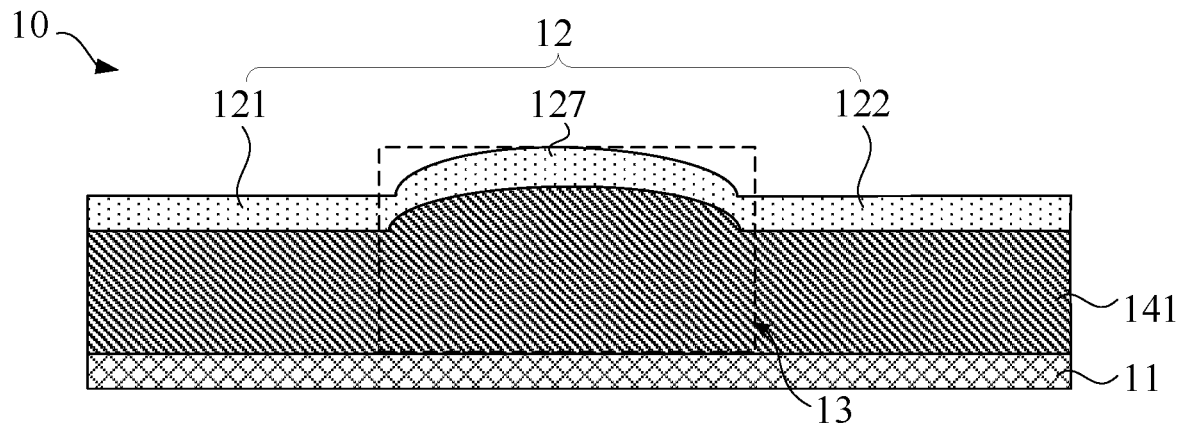
FIG. 11 is a schematic diagram of a seventh structure of an array substrate provided by an embodiment of the present application.

Optionally, the protrusion of the protruding part 13 may be directly formed by a film layer such as a planarization layer or a color resist layer. Please refer to FIG. 11. FIG. 11 is a schematic diagram of a seventh structure of an array substrate provided by an embodiment of the present application. The protruding part 13 comprises the planarization layer 141 and the axis electrode 127. The planarization layer 141 protrudes on a surface of the array substrate 10 away from the substrate 11. The protrusion on the planarization layer 141 can be treated differently by changing the exposure amount to the planarization layer 141 with implementing a halftone mask method. Thus, the planarization layer 141 protrudes on a surface of the array substrate 10 away from the substrate 11.

In this embodiment, the protrusion is directly formed on the planarization layer 141, and the manufacturing process is simpler. Generally, the pixel electrode 12 is disposed on the planarization layer 141. In this embodiment, the protruding part 13 is formed on the planarization layer 141, which can avoid the influence on other film layers. Moreover, it is not necessary to adapt the specific arrangements of other film layers after disposing the protrusions.

Figure 12:
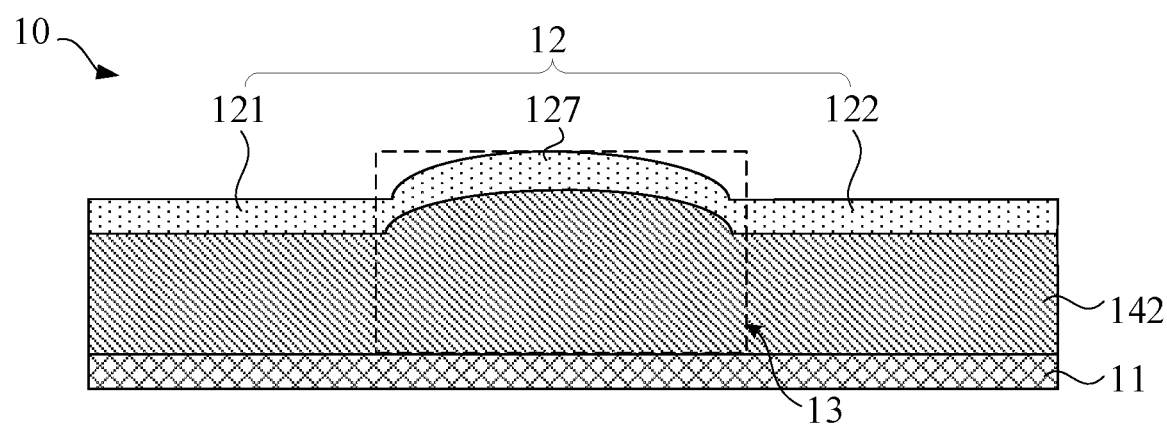
FIG. 12 is a schematic diagram of an eighth structure of an array substrate provided by an embodiment of the present application.

Optionally, please refer to FIG. 12. FIG. 12 is a schematic diagram of an eighth structure of an array substrate provided by an embodiment of the present application. The protruding part 13 comprises the color resist layer 142 and the axis electrode 127. The color resist layer 142 protrudes on a surface of the array substrate 10 away from the substrate 11.

For some liquid crystal display panels using COA technology, protrusions may be disposed on the color resist layer 142 to form the protruding part 13. The COA (Color Filter On Array) technology is to prepare the color filter layer on the array substrate. Because no alignment issue of the color filter substrate and the array substrate exists in the liquid crystal display panel with the COA structure. The difficulty of the cell process in the display panel manufacture process can be reduced to prevent the tolerance of the cell process. Accordingly, the black matrix in the COA structure can be designed to be narrow line width for promoting the aperture ratio. In the present application, the color resist layer 142 is employed to form the protruding part 13, so that the array substrate 10 provided in the present application can be applied to a COA type liquid crystal display panel, and the application field is wider.

Specifically, the protruding part 13 in the array substrate 10 provided by the embodiments of the present application may also be formed with protrusions on any film layer disposed in the substrate 11 and the pixel electrode 12, which is not limited in this application.

Similarly, the array substrate 10 in this embodiment employs pixel electrodes 12 aligned with four domains for illustration. The array substrate 10 may also be applied for pixel electrodes 12 aligned with four-domains and pixel electrodes 12 aligned with eight-domains.

Figure 13:
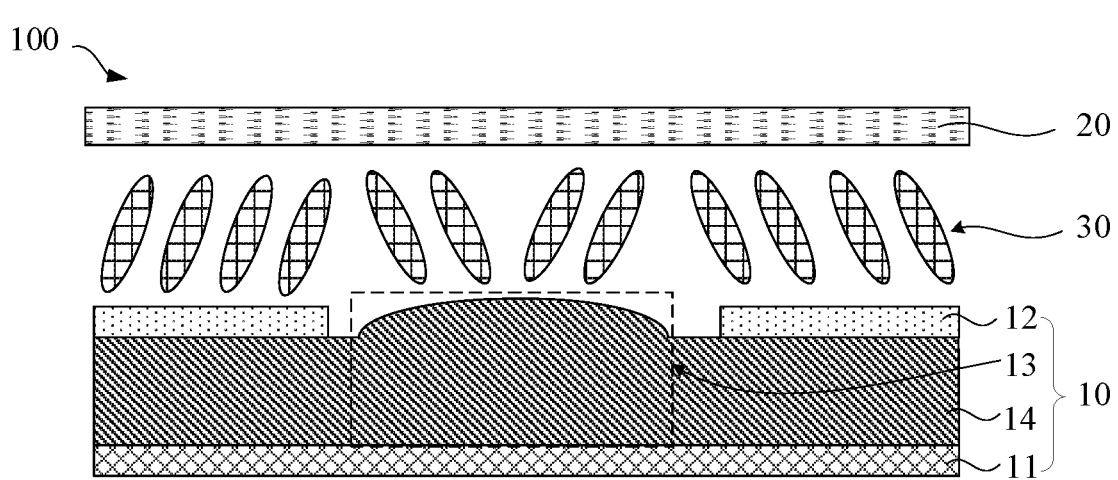
FIG. 13 is a schematic structural diagram of a liquid crystal display panel provided by an embodiment of the present application.

The embodiment of the present application provides a liquid crystal display panel. Please refer to FIG. 13. FIG. 13 is a schematic structural diagram of a liquid crystal display panel provided by an embodiment of the present application. The liquid crystal display panel 100 comprises an array substrate 10, an opposite substrate 20 and a liquid crystal layer 30. The array substrate 10 is any one of the array substrates 10 described above. The opposite substrate 20 is disposed opposite to the array substrate 10. The liquid crystal layer 30 is disposed between the array substrate 10 and the opposite substrate 20. The liquid crystal display panel 100 may also comprise other devices. The opposite substrate 20, the liquid crystal layer 30, and other devices and their assembly in the embodiments of the present application are related technologies well known to those skilled in the art, and will not be repeated here.

The array substrate 10 provided by the embodiment of the present application may be applied to a COA type structure or a non-COA type structure. When the array substrate 10 is applied to the COA structure, the color resist layer is disposed on the side of the array substrate 10. When the array substrate 10 is applied to the non-COA structure, the color resist layer is disposed on the side of the opposite substrate 20.

The liquid crystal display panel 100 provided by the embodiment of the present application comprises one array substrate 10. The array substrate 10 eliminates the main electrode of the buffer area, or eliminates the main electrode of the buffer area and then sets a protruding part and adds DBS electrodes on the array substrate 10. The array substrate 10 provided by the embodiment of the present application reduces the pretilt angle conflict between two adjacent areas, thereby preventing the problem of mutual obstruction when the liquid crystal molecules twist, thereby improving dark clusters and solving the problem of uneven display.

The array substrate and the liquid crystal display panel provided by the embodiments of the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. An array substrate, comprising:
a substrate;
a pixel electrode, disposed on the substrate, wherein the pixel electrode comprises a first area, a second area and a buffer area, and the buffer area is arranged between the first area and the second area;
the pixel electrode comprises a plurality of first branch electrodes and a plurality of second branch electrodes, and the plurality of first branch electrodes is arranged at intervals, the plurality of second branch electrodes is arranged at intervals, and an extension direction of the first branch electrodes intersects an extension direction of the second branch electrodes;
the first branch electrodes are arranged in the first area, and the second branch electrodes are arranged in the second area;
the array substrate comprises a buffer structure arranged in the buffer area and an auxiliary electrode, and the auxiliary electrode and the pixel electrode are arranged in a same layer and possess a gap, and the auxiliary electrode includes a first auxiliary electrode and a second auxiliary electrode, and the first auxiliary electrode is arranged between two adjacent pixel electrodes, the second auxiliary electrode is arranged in the buffer area, and the second auxiliary electrode is connected to the first auxiliary electrode.

2. The array substrate according to claim 1, wherein the buffer structure comprises an opening, and the opening is disposed on the pixel electrode and separates the plurality of first branch electrodes and the plurality of second branch electrodes.

3. The array substrate according to claim 2, further comprising a protruding part, and the protruding part is disposed on the substrate; the protruding part is correspondingly arranged in the buffer area, and the protruding part protrudes away from a surface of the substrate.

4. The array substrate according to claim 3, wherein the protruding part comprises a common electrode and an insulating structure layer that are stacked, and the insulating structure layer is arranged on a side of the common electrode away from the substrate, and the common electrode is employed to make the insulating structure layer protrude on a surface of the array substrate away from the substrate.

5. The array substrate according to claim 4, wherein a width of the common electrode is between 3 micrometers and 10 micrometers.

6. The array substrate according to claim 3, wherein a protrusion height of the protruding part is between 0.05 micrometers and 1 micrometer.

7. The array substrate according to claim 1, wherein the pixel electrode further comprises an axis electrode, and the axis electrode is arranged in the buffer area, and The axis electrode is arranged between the plurality of first branch electrodes and the plurality of second branch electrodes, and connects the plurality of first branch electrodes and the plurality of second branch electrodes;

the buffer structure comprises a protruding part, the protruding part is disposed on the substrate, and the protruding part protrudes on a surface of the array substrate away from the substrate.

8. The array substrate according to claim 7, wherein the protruding part comprises a common electrode and an insulating structure layer that are stacked, and the insulating structure layer is arranged on a side of the common electrode away from the substrate, and the common electrode is employed to make the insulating structure layer protrude on a surface of the array substrate away from the substrate.

9. The array substrate according to claim 8, wherein a width of the common electrode is between 3 micrometers and 10 micrometers.

10. The array substrate according to claim 7, wherein a protrusion height of the protruding part is between 0.05 micrometers and 1 micrometer.

11. The array substrate according to claim 1, wherein a width of the second auxiliary electrode is between 2 micrometers and 10 micrometers.

12. The array substrate according to claim 1, wherein a distance between the second auxiliary electrode and the pixel electrode is between 3 micrometers and 15 micrometers.

13. The array substrate according to claim 1, wherein a width of the buffer area is between 2 micrometers and 12 micrometers.

14. The array substrate according to claim 1, wherein the pixel electrode further comprises a third area and a fourth area, and the pixel electrode further comprises a plurality of third branch electrodes and a plurality of fourth branch electrodes, and the plurality of third branch electrodes are arranged at intervals, and the plurality of fourth branch electrodes are arranged at intervals, and an extension direction of the first branch electrodes intersects an extension direction of the third branch electrodes, and an extension direction of the second branch electrodes intersects an extension direction of the fourth branch electrodes, and the third branch electrodes are arranged in the third area, and the fourth branch electrodes are arranged in the fourth area;

wherein the buffer area is further arranged between the third area and the fourth area, and the buffer structure is further disposed between the plurality of third branch electrodes and the plurality of fourth branch electrodes.

15. The array substrate according to claim 14, wherein the first area and the second area are arranged in a first direction, the third area is arranged in a second direction corresponding to the first area, and the fourth area is arranged in the second direction corresponding to the second area, and the pixel electrode further comprises a connecting electrode and a main electrode, and the connecting electrode is arranged around the pixel electrode, and the main electrode is arranged between the first branch electrodes and the third branch electrodes, and is further arranged between the second branch electrodes and the fourth branch electrodes, and the connecting electrode and the main electrode are connected to the plurality of first branch electrodes, the plurality of second branch electrodes, the plurality of third branch electrodes and/or the plurality of fourth branch electrodes.

16. A liquid crystal display panel, comprising:
an array substrate, comprising a substrate and a pixel electrode, wherein the pixel electrode is disposed on the substrate, and the pixel electrode comprises a first area, a second area and a buffer area, and the buffer area is arranged between the first area and the second area; the pixel electrode comprises a plurality of first branch electrodes and a plurality of second branch electrodes, and the plurality of first branch electrodes is arranged at intervals, the plurality of second branch electrodes is arranged at intervals, and an extension direction of the first branch electrodes intersects an extension direction of the second branch electrodes;
the first branch electrodes are arranged in the first area, and the second branch electrodes are arranged in the second area; the array substrate comprises a buffer structure arranged in the buffer area and an auxiliary electrode, and the auxiliary electrode and the pixel electrode are arranged in a same layer and possess a gap, and the auxiliary electrode includes a first auxiliary electrode and a second auxiliary electrode, and the first auxiliary electrode is arranged between two adjacent pixel electrodes, the second auxiliary electrode is arranged in the buffer area, and the second auxiliary electrode is connected to the first auxiliary electrode;
an opposite substrate, disposed opposite to the array substrate;
a liquid crystal layer, disposed between the array substrate and the opposite substrate.

17. The liquid crystal display panel according to claim 16, wherein the buffer structure comprises an opening, and the opening is disposed on the pixel electrode and separates the plurality of first branch electrodes and the plurality of second branch electrodes.

18. The liquid crystal display panel according to claim 17, wherein the array substrate further comprises a protruding part, and the protruding part is disposed on the substrate; the protruding part is correspondingly arranged in the buffer area, and the protruding part protrudes away from a surface of the substrate.

* * * * *